United States Patent
Kohler (10) Patent No.: US 11,673,827 B2
(45) Date of Patent: Jun. 13, 2023

(54) ANTI-FOGGING COATING AND APPLICATION PROCESS

(71) Applicant: MCS Industries, Inc., Easton, PA (US)

(72) Inventor: Dallas Aaron Kohler, Schnecksville, PA (US)

(73) Assignee: MCS Industries, Inc.

( * ) Notice: Subject to any disclaimer, the term of this patent is extended or adjusted under 35 U.S.C. 154(b) by 147 days.

(21) Appl. No.: 16/151,430

(22) Filed: Oct. 4, 2018

(65) Prior Publication Data

US 2019/0100454 A1 Apr. 4, 2019

Related U.S. Application Data

(60) Provisional application No. 62/567,801, filed on Oct. 4, 2017.

(51) Int. Cl.
*C03C 17/00* (2006.01)
*C03C 17/32* (2006.01)
(Continued)

(52) U.S. Cl.
CPC ............ *C03C 17/009* (2013.01); *C03C 17/02* (2013.01); *C03C 17/23* (2013.01); *C03C 17/322* (2013.01); *C03C 17/3405* (2013.01); *C03C 2217/445* (2013.01); *C03C 2217/478* (2013.01); *C03C 2217/73* (2013.01); *C03C 2217/75* (2013.01); *C03C 2217/78* (2013.01);
(Continued)

(58) Field of Classification Search
CPC ......... C07C 29/36; C07C 33/20; C07C 33/46; C07C 43/23; C03C 17/009; C03C 17/23; C03C 17/322; C03C 17/3405; C03C 2217/445; C03C 2217/478; C03C 2217/73; C03C 2217/75; C03C 2217/78; C03C 2218/112; C03C 2218/31
See application file for complete search history.

(56) References Cited

U.S. PATENT DOCUMENTS 5,316,791 A 5/1994 Farber et al.
5,723,175 A 3/1998 Scholz et al.
(Continued)

FOREIGN PATENT DOCUMENTS

EP 2256153 12/2010
JP H0956549 3/1997
(Continued)

OTHER PUBLICATIONS

Soogard et al. Nano Convergence (2018) 5:6.*
International Search Report and Written Opinion—PCT/US2018/054285, dated Nov. 30, 2018, p. 1-13.

*Primary Examiner* — James M Mellott
(74) *Attorney, Agent, or Firm* — Belles Katz LLC (57) ABSTRACT

Described herein is a method of forming a reflective article comprising applying an anti-fog composition to a major surface of a reflective substrate, the anti-fog composition comprising an anti-fog agent and a liquid carrier and having a solid's content between about 15 wt. % to about 35 wt. % based on the total weight of the anti-fog composition, and subsequently heating the reflective substrate to a temperature of about 80° F. to about 325° F. for a drying period, and wherein the liquid carrier comprises water and a hydroxyl-containing component.

12 Claims, 3 Drawing Sheets

(51) Int. Cl.
*C03C 17/23* (2006.01)
*C03C 17/34* (2006.01)
*C03C 17/02* (2006.01)

(52) U.S. Cl.
CPC .... *C03C 2218/112* (2013.01); *C03C 2218/31* (2013.01); *C03C 2218/32* (2013.01)

(56) References Cited

U.S. PATENT DOCUMENTS

| | | | | |
|---|---|---|---|---|
| 6,068,202 | A | * | 5/2000 | Hynes ............... B05B 7/02 118/241 |
| 2007/0286994 | A1 | * | 12/2007 | Walker ............... G02B 1/111 428/323 |
| 2009/0011256 | A1 | * | 1/2009 | Ito ..................... C09D 183/00 428/447 |
| 2009/0296244 | A1 | * | 12/2009 | Baskett ............... A61B 90/36 359/871 |
| 2011/0003160 | A1 | | 1/2011 | Zhao et al. |
| 2011/0318567 | A1 | * | 12/2011 | Hildenbrand ......... C09D 7/70 428/313.9 |
| 2012/0045650 | A1 | | 2/2012 | Iwazumi |
| 2013/0260145 | A1 | | 10/2013 | Kishikawa et al. |
| 2014/0295175 | A1 | * | 10/2014 | Kishikawa ......... G02B 27/0006 428/336 |
| 2018/0298258 | A1 | * | 10/2018 | Satoh .................... C07F 7/1804 |

FOREIGN PATENT DOCUMENTS

| | | |
|---|---|---|
| JP | H11323194 | 11/1999 |
| JP | 2002161241 | 6/2002 |
| JP | 2002363478 | 12/2002 |
| JP | 2009013329 | 1/2009 |
| JP | 2015107448 | 6/2015 |
| JP | 2016094009 | 5/2016 |
| JP | 2017019985 | 1/2017 |
| RU | 2320692 | 3/2008 |
| RU | 2593871 | 8/2016 |
| SU | 681088 | 8/1979 |
| WO | WO9803607 | 1/1998 |
| WO | WO 2000/000855 A1 | 1/2000 |
| WO | 2005103172 | 11/2005 |
| WO | 2007058374 A1 | 5/2007 |
| WO | 2012024387 | 2/2012 |
| WO | 2012166253 A2 | 12/2012 |
| WO | 2013031738 | 3/2013 |
| WO | 2015146412 A1 | 10/2015 |

\* cited by examiner

ANTI-FOGGING COATING AND APPLICATION PROCESS

CROSS-REFERENCE TO RELATED APPLICATIONS

This application claims the benefit of U.S. Provisional Application No. 62/567,801, filed on Oct. 4, 2017. The disclosure of the above application is incorporated herein by reference.

BRIEF SUMMARY

The present invention is directed to a method of forming a reflective article comprising: a) applying an anti-fog composition to a major surface of a reflective substrate, the anti-fog composition comprising an anti-fog agent and a liquid carrier and having a solid's content between about 10 wt. % to about 30 wt. % based on the total weight of the anti-fog composition; b) heating the reflective substrate to a temperature of about 120° F. to about 325° F. for a drying period; and wherein the liquid carrier comprises a hydroxyl-containing component.

Other embodiments of the present invention include a method of forming a reflective article comprising: a) spray applying an anti-fog composition to a major surface of a reflective substrate, the anti-fog composition comprising an anti-fog agent, silica, and a liquid carrier, the liquid carrier that includes a hydroxyl-containing component comprising: methanol; ethanol; and diacetone alcohol; b) heating the reflective substrate to an elevated temperature to evaporate at least a portion of the liquid carrier from the major surface of the reflective substrate; wherein the hydroxy-containing component is present in an amount ranging from about 60 wt. % to about 80 wt. % based on the total weight of the anti-fog composition.

Other embodiments of the present invention include an anti-fogging mirror comprising: a reflective substrate comprising a first major surface opposite a second major surface, the reflective substrate comprising a glass layer having an upper surface opposite a lower surface whereby the first major surface of the reflective substrate comprises the upper surface of the glass layer; and an anti-fogging coating comprising an anti-fogging composition; wherein the anti-fogging coating is applied to the first major surface of the reflective substrate in an amount ranging from about 0.5 g/ft$^2$ to about 2.0 g/ft$^2$, and the anti-fogging coating has a solids content of about 100%.

Other embodiments of the present invention include a composition for spray-applying to a glass substrate, the composition comprising: an anti-fog agent; silica; liquid carrier comprising:

an alcohol component; a ketone compound; an aromatic compound; and wherein the anti-fog coating composition has a solids content ranging from about 15 wt. % to about 30 wt. % based on the total weight of the anti-fog coating composition, and the alcohol component comprises at least one of methanol, ethanol, butanol, diacetate alcohol, and 1-methoxy-2-propanol.

In other embodiments, the present invention includes a composition for spray-applying to a glass substrate, the composition comprising: an anti-fog agent; silica; liquid carrier comprising: an alcohol component; an aromatic compound; and wherein the anti-fog coating composition has a solids content ranging from about 15 wt. % to about 30 wt. % based on the total weight of the anti-fog coating composition, and the alcohol component comprises at least one of methanol, ethanol, butanol, diacetate alcohol, and 1-methoxy-2-propanol.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

The following description of the preferred embodiment(s) is merely exemplary in nature and is in no way intended to limit the invention, its application, or uses.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Unless otherwise specified, all percentages and amounts expressed herein and elsewhere in the specification should be understood to refer to percentages by weight. The amounts given are based on the active weight of the material.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top," and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such.

Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Unless otherwise specified, all percentages and amounts expressed herein and elsewhere in the specification should be understood to refer to percentages by weight. The amounts given are based on the active weight of the material. According to the present application, the term "about" means +/−5% of the reference value. According to the present application, the term "substantially free" less than about 0.1 wt. % based on the total of the referenced value.

Figure 1:
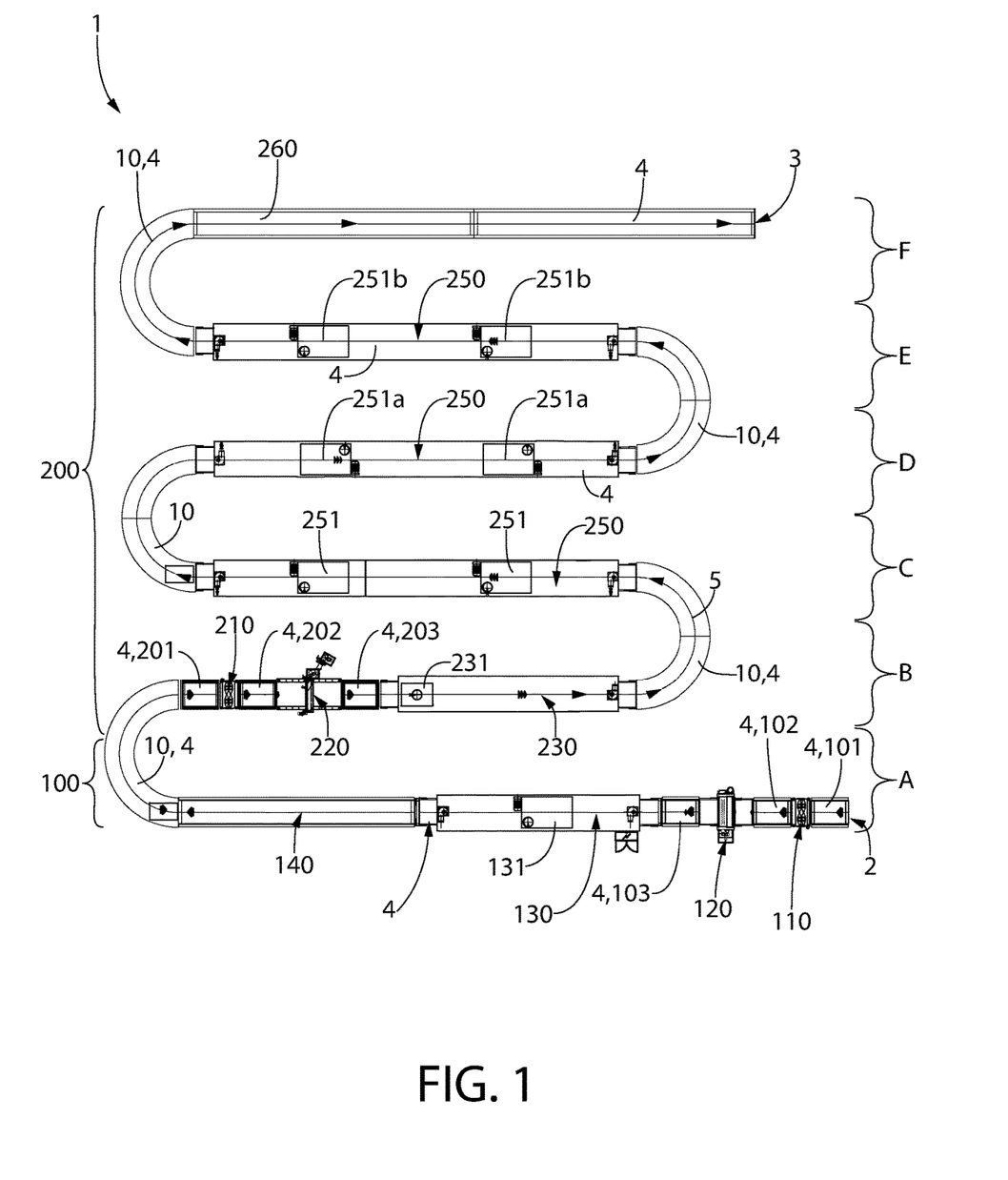
FIG. 1 is schematic view of an anti-fogging coating process according to the present invention.

Referring now to FIG. 1, the present invention is directed to an anti-fogging application system 1 (also referred to as "application system") for preparing anti-fogging reflective substrates—also referred to as fog-free mirrors.

Figure 2:
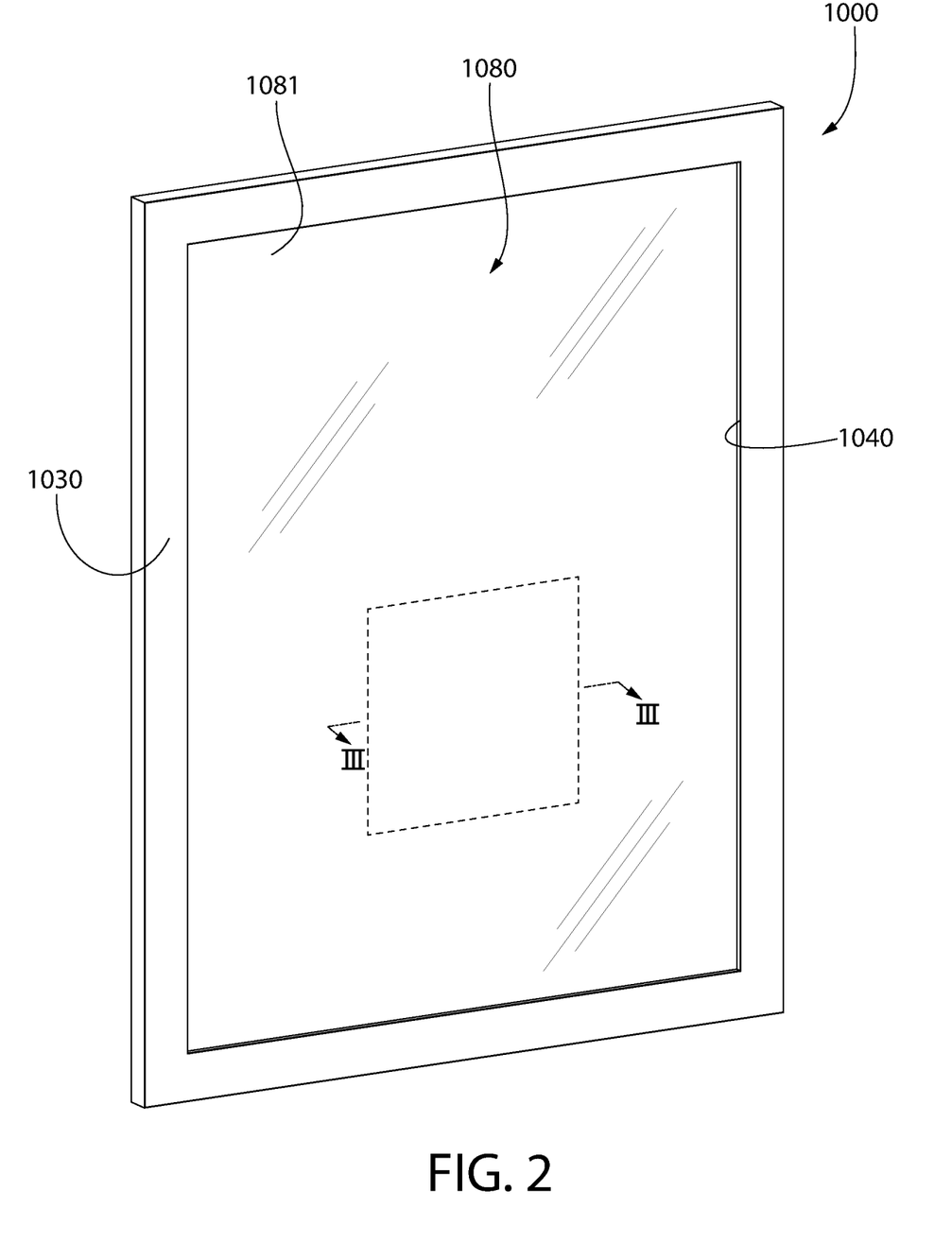
FIG. 2 is a front perspective view of a mirror apparatus comprising a fog-free mirror in accordance with the present invention.
Figure 3:
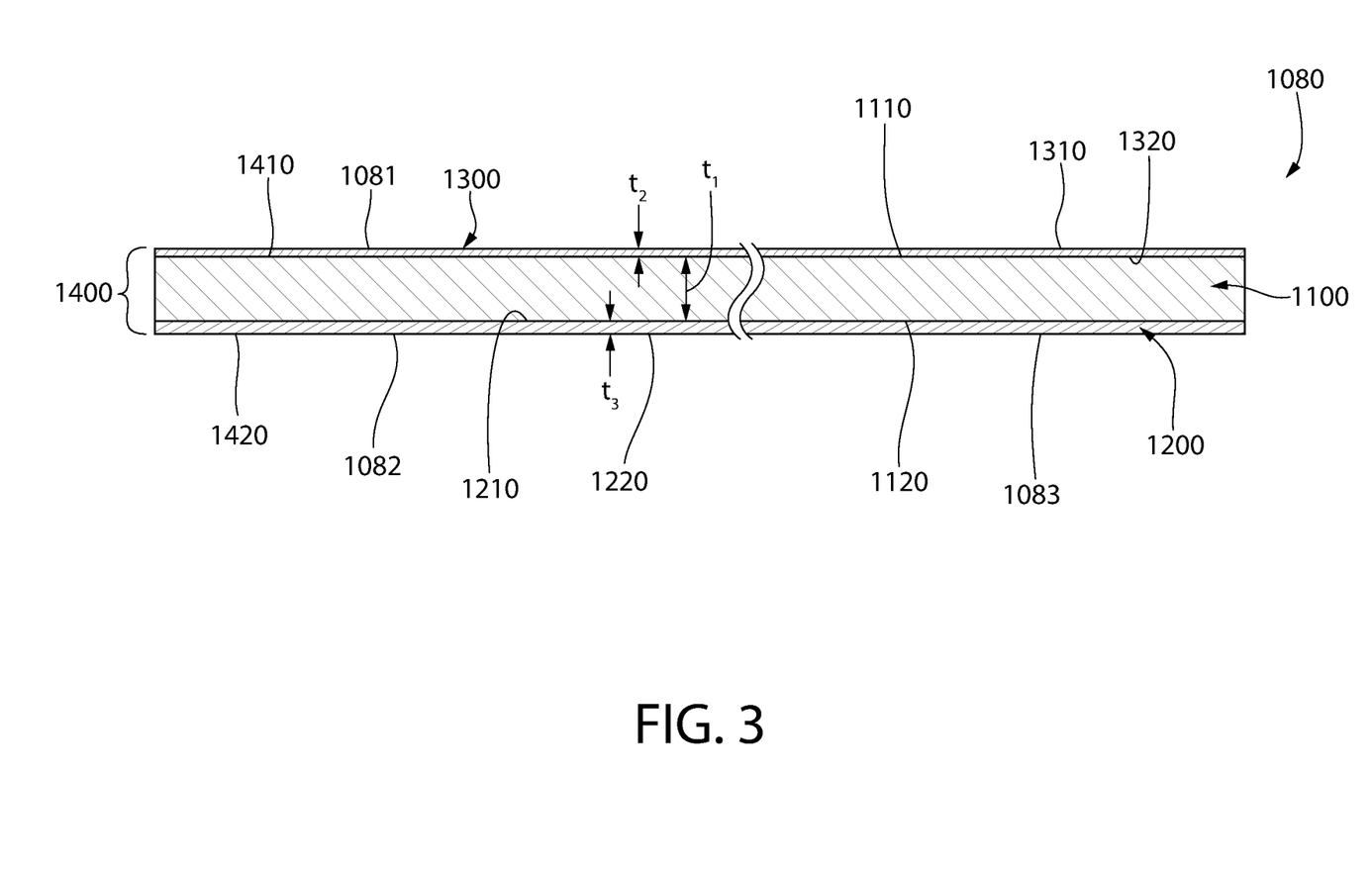
FIG. 3 is a cross-sectional view of a portion of the fog-free mirror according to embodiments of the present invention.

Referring now to FIGS. 2 and 3, a mirror apparatus 1000 comprising the fog-free mirror 1080 produced by the anti-fogging application system 1 is shown. The mirror apparatus 1000 may generally comprises an annular frame 1030 and the fog-free mirror 1080. The annular frame 1030 defines a central opening 1040 and may be comprised of a polymeric material, a cellulosic material (e.g., wood), or a metallic material. The fog-free mirror 1080 may be support within the annular frame 1030. In other embodiments, the mirror apparatus 1 may frameless.

The fog-free mirror 1080 of the present invention may comprise a first major surface 1081 opposite a second major surface 1082. The fog-free mirror 1080 may comprises a reflective substrate 1400 and a fog-free coating 1300 applied thereto.

The reflective substrate 1400 comprises an upper surface 1410 opposite a lower surface 1420. The reflective substrate 1400 may comprise a transparent layer 1100 and a reflective back-coating 1200 applied thereto.

Referring now to FIG. 3 in particular, the transparent layer 1100 may comprise an upper surface 1110 opposite a lower surface 1120. The transparent layer 1100 may have a thickness $t_1$ as measured from the upper surface 1110 to the lower surface 1120 of the transparent layer substrate 1100. The thickness $t_1$ of the transparent layer 1100 may range from about 0.25 mm to about 5.0 mm—including all values and sub-ranges there-between.

The transparent layer 1100 may have a length ranging from about 10 cm to about 200 cm—including all values and sub-ranges there-between. The transparent layer 1100 may have a width ranging from about 10 cm to about 150 cm—including all values and sub-ranges there-between.

The transparent layer 1100 may be formed from an organic material or an inorganic material. Non-limiting examples of organic materials include polymeric material such as thermoplastic polymer that include one or more of polymethyl methacrylate (PMMA); polystyrene; polycarbonate; polyethylene terephthalate; and a combination of two or more thereof. In other embodiments, the transparent layer 1100 may be formed from an inorganic material, such as glass—i.e., silicate glass.

In forming the reflective substrate 1400, the reflective back-coating 1200 may be applied to the transparent layer 1100. The reflective back-coating 1200 may comprise an upper surface 1210 opposite a lower surface 1220. The reflective back-coating 1200 may be applied to the lower surface 1120 of the transparent layer 1100 such that the upper surface 1210 of the reflective back-coating 1200 is faces the lower surface 1120 of the transparent layer 1100. In some embodiments, the upper surface 1210 of the reflective back-coating 1200 and the lower surface 1120 of the transparent layer 1100 may be in direct contact.

The reflective back coating 1200 may be formed of any suitable reflective composition suitable for producing a mirror surface—a non-limiting example are silver-based compositions or aluminum-based compositions. The reflective back coating 1200 may have a thickness $t_3$ that is sufficiently thin such that the resulting thickness $t_1$ of the reflective substrate 1400 is substantially equal to the thickness of the transparent layer 1100.

The lower surface 1420 of the reflective substrate 1400 may comprise the lower surface 1220 of the reflective back-coating 1200. The upper surface 1410 of the reflective substrate 1400 may comprise the upper surface 1110 of the transparent layer 1100.

In forming the fog-free mirror 1080, the fog-free coating 1300 may be applied to the reflective substrate 1400. Specifically, in forming the fog-free mirror 1080, the fog-free coating 1300 may be applied to the transparent layer 1100 portion of the reflective substrate 1400.

The fog-free coating 1300 may comprise an upper surface 1310 opposite a lower surface 1320. The fog-free coating 1300 may be applied to the upper surface 1410 of the reflective substrate 1400. The fog-free coating 1300 may be applied to the upper surface 1110 of the transparent layer 1100 of the reflective substrate 1400. The lower surface 1320 of the fog-free coating 1300 may face the upper surface 1410 of the reflective substrate 1400. In some embodiments, the lower surface 1320 of the fog-free coating 1300 and the upper surface 1410 of the reflective substrate 1400 may be in direct contact. Specifically, the lower surface 1320 of the fog-free coating 1300 may face the upper surface 1110 of the transparent layer 1100. In some embodiments, the lower surface 1320 of the fog-free coating 1300 and the upper surface 1110 of the transparent layer 1100 may be in direct contact.

The fog-free coating may be formed of a fog-free formulation, as described further herein. The mirror apparatus 1000 comprises the fog-free coating in a dry-state on the reflective substrate 1400. According to the present invention, the phrase "dry-state" indicates a composition that is substantially free of a liquid carrier (e.g., solvent, liquid water). Thus, fog-free coating 1300 in the dry-state may comprise surface-modifying agents, such as surfactants, and have less than about 0.1 wt. % of solvent liquid carrier based on the total weight of the fog-free coating 1300. In a preferred embodiment, the fog-free coating 1300 in the dry-state has a solid's content of about 100 wt. % based on the total weight of the fog-free coating 1300. Conversely, a composition that is in a "wet-state," which refers to a composition containing various amounts of solvent/liquid carrier—as discussed further herein.

The fog-free coating 1300 in the dry-state may have a thickness $t_2$ as measured from the upper surface 1310 to the lower surface 1320 of the fog-free coating 1300 in the dry-state. The thickness $t_3$ of the dry-state fog-free coating 1300 may range from about 4 microns to about 15 microns—including all thicknesses and sub-ranges there-between. In a preferred embodiment, the thickness $t_3$ of the dry-state fog-free coating 1300 may range from about 6 microns to about 12 microns—including all thicknesses and sub-ranges there-between. Even more preferred, the thickness $t_3$ of the dry-state fog-free coating 1300 may range from about 9 microns to about 10 microns—including all thicknesses and sub-ranges there-between.

The fog-free coating 1300 in the dry-state may be present on the upper surface 1410 of the reflective substrate 1400 in an amount ranging from about 0.5 g/ft$^2$ to about 2.0 g/ft$^2$—including all amounts and sub-ranges there-between. In a preferred embodiment, the fog-free coating 1300 in the dry-state may be present on the upper surface 1410 of the reflective substrate 1400 in an amount ranging from about 0.8 g/ft$^2$ to about 1.9 g/ft$^2$—including all amounts and sub-ranges there-between. In an even more preferred embodiment, the fog-free coating 1300 in the dry-state may be present on the upper surface 1410 of the reflective substrate 1400 in an amount ranging from about 1.0 g/ft$^2$ to about 1.8 g/ft$^2$—including all amounts and sub-ranges there-between.

The transparent layer 1100 may be substantially clear. For the purposes of this application, the phrases "substantially clear" or "optically clear" refers to materials having an optical transmission of at least about 90%. The transparent layer 1100 should be substantially clear such that the underlying reflective back coating 1200 forms a reflective surface on the lower surface 1120 of the transparent layer 1100 when viewed in a direction extending from at least the upper surface 1410 towards the lower surface 1420 of the reflective substrate 1400. The fog-free coating 1300 may be substantially clear such that the upper surface 1410 of the underlying reflective substrate 1400 is completely visible from the first major surface 1081 of the mirror 1080. The transparent layer 1100 should be substantially clear such that the underlying back reflective coating 1200 forms a reflective surface when viewed from the first major surface 1081 of the fog-free mirror 1080. A viewer should see their reflection in the reflective surface when viewing the mirror 1080 in the direction of the first major surface 1081 towards the second major surface 1082 of the mirror 1080.

Referring now to FIG. 1, the present invention further includes an application system 1 for forming the mirror 1080 of the mirror apparatus 1000 of the present invention. The application system 1 may comprise at least two major stages—a primer stage 100 and an anti-fogging stage 200. In some embodiments, the application system 1 may comprise only the anti-fogging stage 200.

Although the previously discussed reflective substrate 1400 is not called out by number in FIG. 1 for the sake of clarity in the figure, the reflective substrate discussed herein with respect to the application system 1 is the same as the previously discussed reflective substrate 1400 of FIGS. 2 and 3.

The reflective substrate may enter the application system 1 at an entrance point 2 (also referred to as a "starting point") located at the beginning of the primer stage. The reflective substrate may leave the application systems 1 at an exit point 3 (also referred to as an "ending point") located at the end of the anti-fogging stage 200. Generally, the reflective substrate may move through both the primer stage 100 and the anti-fogging stage 200 of the application systems 1 along a machine direction 5. The machine direction 5 may be the direction along one or more conveyor belts 4, as discussed in greater detail herein. Each of the primer stage 100 and anti-fogging stage 200 may independently comprise one or more sub-stages, as discussed in greater detail herein.

As described in greater detail herein, the application system 1 of the present invention may apply one or more compositions (i.e., primer composition, anti-fogging composition) to the upper surface 1410 of the reflective substrate 1400. The compositions may be applied by curtain coating or spray coating.

The primer stage 100 may include a portion of the conveyor belt 4 of the overall application system 1. Specifically, the primer stage 100 may comprise a plurality of individual conveyor belts that perform specified tasks within the primer stage 100—such as conveying the reflective substrate along the machine direction 5 in a constant velocity or conveying the reflective substrate along the machine direction 5 in a non-constant velocity (i.e., accelerating or decelerating the velocity of the reflective substrate along the machine direction 5). In a preferred embodiment, the conveyor belts convey the reflective substrate along the machine direction 5 in substantially a constant velocity.

The primer stage 100 may comprise an infeed belt conveyor 101 that begins at the entrance point 2 of the application system 1. The infeed belt conveyor 101 may receive an untreated reflective substrate, whereby the upper surface of the reflective substrate faces upward, and the lower surface of the reflective substrate faces the infeed belt conveyor 101 such that the infeed belt conveyor 101 supports the reflective substrate. The infeed belt conveyor 101 then conveys the reflective substrate along the machine direction 5. The infeed belt conveyor 101 may convey the reflective substrate along the machine direction 5 at a constant velocity ranging from about 5 ft/min to about 20 ft/min—including all velocities and sub-ranges there-between. In a preferred embodiment, the infeed belt conveyor 101 may convey the reflective substrate along the machine direction 5 at a constant velocity ranging from about 10 ft/min to about 15 ft/min—including all velocities and sub-ranges there-between.

The primer stage 100 may comprise a deionizing dusting unit 110 that deionizes at least the upper surface of the reflective substrate. Deionizing of the reflective substrate helps prevent static buildup as well as remove dust and impurities from the major surface of the reflective substrate that can otherwise interfere with the primer and anti-fogging application process—as discussed in greater detail herein. The deionizing dusting unit may comprise a housing through which the 110 infeed belt conveyor 101 passes. Under this configuration, the reflective substrate may pass through the deionizing dusting unit 110 via the infeed belt conveyor 101 at the previously discussed conveyor speeds.

Once through the deionizing dusting unit 110, the reflective substrate may be transferred from the infeed belt conveyor 101 to an acceleration conveyor 102. The acceleration conveyor 102 receives the deionized reflective substrate whereby the upper surface of the reflective substrate faces upward, and the lower surface faces the acceleration conveyor 102 such that the acceleration conveyor 102 supports the reflective substrate. The acceleration conveyor 102 then conveys the reflective substrate along the machine direction 5 in a non-constant and increasing velocity. The acceleration conveyor 102 may increase the velocity of the reflective substrate along the machine direction 5 from about 2,500% to about 5,500% compared to the velocity of the reflective substrate along the infeed belt conveyor 101—including all velocities and sub-ranges there-between. The acceleration conveyor 102 may accelerate the speeds along the machine direction 5 to about 200 ft/min to about 400 ft/min—including all velocities and sub-ranges there-between.

In other embodiments, the acceleration conveyor 102 may be operated at a substantially constant velocity that is substantially equal to the velocity of the infeed belt conveyor 101.

Downstream of the deionizing dusting unit 110 is a primer station 120. The reflective substrate may pass through the primer station 120 via the acceleration conveyor 102. Stated otherwise, the acceleration conveyor 102 may pass through the primer station 120. The primer station 120 may apply a primer composition to the first major surface of the reflective substrate as the reflective substrate passes through the primer station 120. The primer may be applied by spray or curtain coating. In a preferred embodiment, the primer is applied by spray application.

The primer composition may comprise a primer agent and a first liquid carrier. Non-limiting examples of a primer agent include polyurethane. The polyurethane may be in the form of an aqueous polyurethane dispersion. In general, an aqueous polyurethane dispersion typically is a polyurethane-polyurea, i.e., a polymer characterized by the occurrence of both urethane (—NH—CO—O—) and urea (—NH—CO—NH—) groups in a macromolecular chain. These groups are formed by well-known polyaddition reactions between polyisocyanates and polyols, leading to polyurethane segments, and between polyisocyanates and polyamines, leading to polyurea segments. The selection of particular polyisocyanates, polyols, and polyamines suitable for the production of an aqueous polyurethane dispersion is generally the same as that known from conventional polyurethane chemistry. In particular, however, the isocyanate must exhibit sufficient stability towards water during processing.

The urethane polymer of the present invention may be formed by condensation of a multi-functional isocyanate with a polyol and an anionic diol, such as dimethylolpropionic acid. When this high molecular weight prepolymer is dispersed in water in the presence of a dispersing agent, particularly a tertiary amine, such as triethanolamine, it forms an anionically stabilized colloidal dispersion. In addition, the aqueous polyurethane dispersion may be blended with anionically stabilized acrylic emulsions. The aqueous polyurethane dispersion preferably has a pH in the range of about 7 to about 9, a solids content ranging from about 5% to about 40%, and an average particle size in the range of about 10 to about 100 nm. Such small particles are preferred so that the cured polyurethane will be transparent; however, in order to form and maintain such small particles, the aqueous polyurethane dispersion must be anionically stabilized.

Preferred isocyanates for forming an aliphatic polyurethane include isophorone diisocyanate, dicyclohexylmethane diisocyanate, hexamethylene diisocyanate, and tetramethylxylene diisocyanate. In certain applications where light stability is not required, or where low cost is necessary, aromatic urethanes formed by using toluene diisocyanate or diphenylmethane diisocyanate may be used.

A wide range of commercially available polyols, including linear or slightly branched polyether, polyester, and polycarbonate polyols can be used in forming the polyurethane of the present invention. Particularly preferred polyols include polyether diols and polyester diols. Short chain diols and triols are also used to adjust the urethane group content and polymer branching. Other polyol types, such as epoxy-resins, hydroxy-acrylates, or oil-modified alkyd resins, may be used to impart special properties.

When polyurethane dispersions are formed in an aqueous medium, the isocyanates may also react with the water. Water hydrolyzes isocyanate groups to yield amines and evolve carbon dioxide. Amino groups formed in this manner can then react with the remaining isocyanate groups to form urea linkages which will contribute to the extension of the macro-molecular chain, as well as to the typical properties of an aqueous polyurethane dispersion. However, this isocyanate/water reaction is preferably minimized during the production of high performance polyurethane dispersions because the evolution of $CO_2$ causes undesirable results in severe foaming. Moreover, aqueous polyurethane dispersions which have been built up predominantly by such "water chain extension" tend to be inferior in polymer performance to those polyurethanes which have been chain extended by polyamines.

The first liquid carrier may comprise a component selected from water, organic solvent, and combinations thereof. When the polyurethane is provided in the form of an aqueous polyurethane dispersion, the first liquid carrier comprises water. The primer composition may have a solid's content ranging from about 5 wt. % to about 20 wt. %—including all amounts and sub-ranges there-between. The primer composition may have a pH ranging from about 7 to about 10—including all pHs and subranges there-between. In a preferred embodiment, the primer composition has a slightly basic pH ranging from about 8 to about 9.

The first liquid carrier may comprise water, whereby the water is present in an amount ranging from about 40 wt. % to about 75 wt. % based on the total weight of the primer composition—including all amounts and sub-ranges there-between. In a preferred embodiment, water is present in an amount ranging from about 55 to about 70 wt. % based on the total weight of the primer composition.

The first liquid carrier may comprise a first organic solvent, whereby the first organic solvent is present in an amount ranging from about 10 wt. % to about 35 wt. % based on the total weight of the primer composition—including all amounts and sub-ranges there-between. In a preferred embodiment, first organic solvent is present in an amount ranging from about 15 to about 30 wt. % based on the total weight of the primer composition.

The first organic solvent may comprise N-methyl-2-pyrrolidone (also referred to as "NMP"). The first organic solvent may comprise a hydroxyl-containing compound. In some embodiments, the first organic solvent may comprise a blend of a first hydroxy-containing compound and a second hydroxyl-containing compound—whereby the first and second hydroxyl-containing compounds are not the same. Non-limiting examples of the hydroxyl-containing compounds include isopropyl alcohol (also referred to as "IPA"), 2-butoxyethanol, and mixtures thereof. The first hydroxy-containing compound may be IPA and the second hydroxyl-containing compound may be 2-butoxyethanol. The first hydroxy-containing compound and the second hydroxyl-containing compound may be present in a weight ratio ranging from about 2:1 to about 1:2—including all ratios and sub-ranges there-between.

In non-limiting examples, the primer composition may comprise IPA in an amount ranging from about 5 wt. % to about 15 wt. % based on the total weight of the primer composition—including all amounts and sub-ranges there-between. In non-limiting examples, the primer composition may comprise 2-butoxyethanol in an amount ranging from about 5 wt. % to about 15 wt. % based on the total weight of the primer composition—including all amounts and sub-ranges there-between. In non-limiting examples, the primer composition may comprise NMP in an amount ranging from about 1 wt. % to about 5 wt. % based on the total weight of the primer composition—including all amounts and sub-ranges there-between.

The primer composition may be spray applied to the first major surface of the reflective substrate. The primer composition may be spray applied by an automated spray machine (also referred to as an "automatic spray machine"). The primer composition may be applied at an atomizing air pressure ranging from about 30 psi to about 50 psi—including all pressures and sub-ranges there-between. The primer composition may be applied in a single pass or as multiple passes. In some embodiments, the primer composition may be applied in two or more application steps.

Once the primer composition is applied to the reflective substrate and the reflective substrate is through (i.e., downstream) the primer station 120, the reflective substrate may be transferred from the acceleration conveyor 102 to a deceleration conveyor 103. The deceleration conveyor 103 receives the primer coated reflective substrate whereby the upper surface faces upward and the lower surface faces the deceleration conveyor 103 such that the deceleration conveyor 103 supports the reflective substrate. The deceleration conveyor 103 then conveys the reflective substrate along the machine direction 5 in a non-constant and decreasing velocity. The deceleration conveyor 103 may decrease the velocity of the reflective substrate along the machine direction 5 from about 2,500% to about 5,500% compared to the final or maximum velocity of the reflective substrate along the acceleration conveyor 102—including all velocities and sub-ranges there-between. The deceleration conveyor 103 may have deceleration speeds along the machine direction 5 from about 200 ft/min to about 400 ft/min—including all velocities and sub-ranges there-between.

In other embodiments, the deceleration conveyor 103 may be operated at a substantially constant velocity that is substantially equal to the velocity of the infeed belt conveyor 101 and/or the acceleration conveyor 102.

Downstream of the primer station 120 is a first drying station 130. The first drying station 130 may comprise a housing through which the deceleration conveyor 103 passes. Therefore, the reflective substrate may pass through the housing of the first drying station 130 via the deceleration conveyor 103. The housing may comprise one or more heating units 131 that heat the housing to an elevated temperature. The elevated temperatures may range from about 225° F. to about 325° F.—including all temperatures and sub-ranges there-between. In a preferred embodiment, the elevated temperatures may range from about 250° F. to about 300° F.—including all temperatures and sub-ranges there-between. The reflective substrate may pass through the first drying station 130 at a velocity such that the reflective substrate is exposed to the elevated temperature for a first drying time period ranging from about 2 min to about 7 min—including all times and sub-ranges there-between. In some embodiments, the reflective substrate may pass through the first drying station 130 at a velocity such that the reflective substrate is exposed to the elevated temperature for a first drying time period ranging from about 3 min to about 6 min—including all times and sub-ranges there-between. The elevated temperature and first drying time period may be selected such that substantially all of the first liquid carrier has been evaporated from the first major surface of the reflective substrate.

Downstream of the first drying station 130 is a first cooling station 140. The first cooling station 140 may comprise a housing through which the conveyor 4 passes. The housing may comprise one or more cooling units (not pictured) that help cool reflective substrate from the elevated temperature back to lower temperature. The first cooling station 140 may perform the cooling by blowing ambient temperature air (i.e., air at room temperature, about 70° F.) or cooled air onto the reflective substrate. The cooled air may have a temperature ranging from about 40° F. to about 70° F.—including all temperatures and sub-ranges there-between. The reflective substrate may pass through the first cooling station 140 at a velocity such that the reflective substrate is cooled for a first cooling time period ranging from about 8 min to about 19 min—including all times and sub-ranges there-between. The first cooling time period may be selected such that the reflective substrate exhibits a maximum temperature of about 110° F. at the end of the first cooling time period.

Downstream of the first cooling station 140 is high temperature belt conveyor 10. The high temperature belt conveyor 10 may transfer primed reflective substrate from the primer stage 100 to the anti-fogging stage 200. The primer stage 100 may be performed entirely within a clean room. The term "clean room" is a term used to refer to an enclosed room in which air is delivered in highly filtered form to produce a substantially dirt and dust free environment. These types of rooms are used for sensitive manufacturing processes, for example, in the electronics and microcircuitry industry.

According to the present invention, the application system may omit the primer stage 100, whereby the reflective substrate is supplied directly to the anti-fogging stage 200.

The anti-fogging stage 200 may include a portion of the conveyor belt 4 of the overall application system 1. Specifically, the anti-fogging stage 200 may comprise a plurality of individual conveyor belts that perform specified tasks within the anti-fogging stage 200—such as conveying the reflective substrate along the machine direction 5 in a constant velocity or conveying the reflective substrate along the machine direction in a non-constant velocity (i.e., accelerating or decelerating the velocity of the reflective substrate along the machine direction 5). In a preferred embodiment, the conveyor belts of the anti-fogging stage 200 may convey the reflective substrate along the machine direction 5 at a substantially constant velocity that is substantially equal to the velocity of the infeed belt conveyor 101 and/or the acceleration conveyor 102.

The anti-fogging stage 200 may comprise an infeed belt conveyor 201. For the embodiments that include the primer stage 100, the infeed belt conveyor 201 may begin at the termination of the high temperature belt conveyor 10 that bridges the primer stage 100 to the anti-fogging stage 200. The infeed belt conveyor 201 may receive the reflective substrate, whereby the upper surface of the reflective substrate faces upward, and the lower surface faces the infeed belt conveyor 201 such that the infeed belt conveyor 201 supports the reflective substrate. The infeed belt conveyor 201 then conveys the reflective substrate along the machine direction 5. The infeed belt conveyor 201 may convey the reflective substrate along the machine direction 5 at a constant velocity ranging from about 5 ft/min to about 20 ft/min—including all velocities and sub-ranges there-between. In a preferred embodiment, the infeed belt conveyor 201 may convey the reflective substrate along the machine direction 5 at a constant velocity ranging from about 10 ft/min to about 15 ft/min—including all velocities and sub-ranges there-between.

The anti-fogging stage 200 may also comprise a deionizing dusting unit 210 that deionizes at least the first major surface of the reflective substrate. The deionizing dusting unit 210 of the anti-fogging stage 200 may be the same as the deionizing dusting unit 110 of the primer stage 100 in that both deionizing units are separate units but perform the same function using the same operation parameters. The deionizing dusting unit 210 may comprise a housing through which the infeed belt conveyor 201 passes. Under this configuration, the reflective substrate may pass through the deionizing dusting unit 210 via the infeed belt conveyor 201 at the previously discussed conveyor speeds. In some embodiments where the reflective substrate is processed through the primer stage 100, the anti-fogging stage 200 may omit the deionizing dusting unit 210. In some embodiments where the application system 1 omits the primer stage, the anti-fogging stage 200 may comprise the deionizing dusting unit 210.

Once through the deionizing dusting unit 210, the reflective substrate may be transferred from the infeed belt conveyor 201 to an acceleration conveyor 202. The acceleration conveyor 202 of the anti-fogging stage 200 may be the same as the acceleration conveyor 102 of the primer stage 100 in that both acceleration conveyors are separate units but perform the same function using the same operation parameters.

The acceleration conveyor 202 receives the deionized reflective substrate whereby the first major surface faces upward and the second major surface faces the acceleration conveyor 202 such that the acceleration conveyor 202 supports the reflective substrate. The acceleration conveyor 202 then conveys the reflective substrate along the machine direction 5 in a non-constant and increasing velocity.

For the embodiments where the anti-fogging stage 200 comprises curtain coating, the acceleration conveyor 202 may increase the velocity of the reflective substrate along the machine direction 5 from about 1,500% to about 3,500% compared to the velocity of the reflective substrate along the infeed belt conveyor 201—including all velocities and sub-ranges there-between. The acceleration conveyor 202 may create acceleration speeds along the machine direction 5 from about 100 ft/min to about 200 ft/min—including all velocities and sub-ranges there-between.

For the embodiments where the anti-fogging stage 200 comprises spray coating, the acceleration conveyor 202 may increase the velocity of the reflective substrate along the machine direction 5 from about 200% to about 300% compared to the velocity of the reflective substrate along the infeed belt conveyor 201—including all velocities and sub-ranges there-between. The acceleration conveyor 202 may create acceleration speeds along the machine direction 5 from about 20 ft/min to about 45 ft/min—including all velocities and sub-ranges there-between. In a preferred embodiment, the acceleration conveyor 202 may create acceleration speeds along the machine direction 5 from about 20 ft/min to about 30 ft/min—including all velocities and sub-ranges there-between.

In other embodiments, the acceleration conveyor 202 may be operated at a substantially constant velocity that is substantially equal to the velocity of the infeed belt conveyor 101 and/or the acceleration conveyor 102.

Downstream of the deionizing dusting unit 210 is an anti-fogging station 220. The reflective substrate may pass through the anti-fogging station 220 via the acceleration conveyor 202. Stated otherwise, the acceleration conveyor 202 may pass through the anti-fogging station 220. The anti-fogging station 220 may apply an anti-fogging composition to the first major surface of the reflective substrate as the reflective substrate passes through the anti-fogging station 220.

The anti-fogging composition may comprise an anti-fogging agent and a second liquid carrier. Non-limiting examples of an anti-fogging agent include polysiloxnae, urethane-based materials including polyurethane, and blends thereof. The anti-fogging composition may be those disclosed in US Patent Application Publication No. 2012/0045650—hereby incorporated by reference in its entirety.

The second liquid carrier may comprise a component selected from water, organic solvent, and combinations thereof. The anti-fogging composition may have a solid's content ranging from about 5 wt. % to about 35 wt. %—including all amounts and sub-ranges there-between. In a preferred embodiment, the anti-fogging composition may have a solid's content ranging from about 5 wt. % to about 30 wt. %—including all amounts and sub-ranges there-between. In some embodiments, the anti-fogging composition may have a solid's content ranging from about 5 wt. % to about 20 wt. %—including all amounts and sub-ranges there-between—preferably about 8 wt. % to about 15 wt. %. In other embodiments, the anti-fogging composition may have a solid's content ranging from about 18 wt. % to about 25 wt. %—including all amounts and sub-ranges there-between.

The anti-fogging composition may have a pH ranging from about 3.5 to about 6.0—including all pHs and sub-ranges there-between. In a preferred embodiment, the anti-fogging composition has an acidic pH ranging from about 4.0 to about 5.5.

The second liquid carrier may comprise water, whereby the water is present in an amount ranging from about 1 wt. % to about 55 wt. % based on the total weight of the anti-fogging composition—including all amounts and sub-ranges there-between. In a preferred embodiment, water is present in an amount ranging from about 5 to about 20 wt. % based on the total weight of the anti-fogging composition—including all amounts and sub-ranges there-between, preferably less than 15 wt. %.

The second liquid carrier may comprise a second organic solvent, whereby the second organic solvent is present in an amount ranging from about 15 wt. % to about 80 wt. % based on the total weight of the anti-fogging composition—including all amounts and sub-ranges there-between. In a preferred embodiment, second organic solvent is present in an amount ranging from about 30 to about 80 wt. % based on the total weight of the anti-fogging composition. In a preferred embodiment, second organic solvent is present in an amount ranging from about 40 to about 75 wt. % based on the total weight of the anti-fogging composition. In a preferred embodiment, second organic solvent is present in an amount ranging from about 50 to about 75 wt. % based on the total weight of the anti-fogging composition.

The second organic solvent may comprise one or more ketone compounds such methyl ethyl ketone (also referred to as "MEK") or 2-butoxyethyle acetate. The second organic solvent may comprise a hydroxyl-containing compound. In some embodiments, the second organic solvent may comprise a hydroxyl-containing component that is one or more of hydroxy-containing compounds. Non-limiting examples of the hydroxyl-containing compounds include methanol, ethanol, n-butanol, diacetone alcohol, 1-methoxy-2-propanol, and mixtures thereof. The first hydroxy-containing compound may be diacetone alcohol and the second hydroxyl-containing compound may be 1-methoxy-2-propanol.

In a non-limiting embodiment, the methanol may be present in an amount ranging from about 4 wt. % to about 30 wt. %—including all amounts and sub-ranges there-between. In the embodiments where the anti-fogging composition comprises both methanol and ethanol, the methanol may be present in an amount ranging from about 4 wt. % to about 10 wt. %—including all amounts and sub-ranges there-between—preferably about 6 wt. %. In the embodiments where the anti-fogging composition comprises both methanol and MEK, the methanol may be present in an amount ranging from about 20 wt. % to about 30 wt. %—including all amounts and sub-ranges there-between.

In a non-limiting embodiment, the ethanol may be present in an amount ranging from about 0.1 wt. % to about 3 wt. %—including all amounts and sub-ranges there-between. In a preferred embodiment, the ethanol may be present in an amount ranging from about 0.3 wt. % to about 1.0 wt. %—including all amounts and sub-ranges there-between—preferably about 0.6 wt. %.

In a non-limiting embodiment, the diacetone alcohol may be present in an amount ranging from about 1 wt. % to about 35 wt. %—including all amounts and sub-ranges there-between. In the embodiments where the anti-fogging composition comprises both ethanol and diacetone alcohol, the diacetone alcohol may be present in an amount ranging from about 1 wt. % to about 10 wt. %—including all amounts and sub-ranges there-between—preferably about 4.3 wt. %. In the embodiments where the anti-fogging composition comprises both ethanol and diacetone alcohol, the anti-fog composition may be substantially free of MEK. In the embodiments where the anti-fogging composition comprises both diacetone alcohol and MEK, the diacetone alcohol may be present in an amount ranging from about 15 wt. % to about 30 wt. %—including all amounts and sub-ranges there-between.

In a non-limiting embodiment, the MEK may be present in an amount ranging from about 5 wt. % to about 15 wt. %—including all amounts and sub-ranges there-between. In a preferred embodiment, the MEK may be present in an amount ranging from about 8 wt. % to about 12 wt. %—including all amounts and sub-ranges there-between. In the embodiments there the anti-fog composition is substantially free of MEK and substantially free of ethanol, the diacetone alcohol may be present in an amount ranging from about 15 wt. % to about 26 wt. %—including all amounts and sub-ranges there-between.

In a non-limiting embodiment, the n-butanol may be present in an amount ranging from about 1 wt. % to about 10 wt. %—including all amounts and sub-ranges there-between. In the embodiments where the anti-fogging composition comprises both ethanol and n-butanol, the n-butanol may be present in an amount ranging from about 5 wt. % to about 10 wt. %—including all amounts and sub-ranges there-between—preferably about 8 wt. %. In the embodiments where the anti-fogging composition is substantially free of ethanol, the n-butanol may be present in an amount ranging from about 1 wt. % to about 3 wt. %—including all amounts and sub-ranges there-between.

In a non-limiting embodiment, the toluene may be present in an amount ranging from about 0.05 wt. % to about 0.5 wt. %—including all amounts and sub-ranges there-between. In a preferred embodiment, the toluene may be preset in an amount ranging from about 0.1 wt. % to about 0.2 wt. %—including all amounts and sub-ranges there-between. In the embodiments where the anti-fogging composition comprises both ethanol and toluene, the anti-fog composition may be substantially free of MEK.

In non-limiting examples, the primer composition may comprise MEK in an amount ranging from about 5 wt. % to about 15 wt. % based on the total weight of the primer composition—including all amounts and sub-ranges there-between. In non-limiting examples, the primer composition may comprise 1-methoxy-2-propanol in an amount ranging from about 10 wt. % to about 15 wt. % based on the total weight of the primer composition—including all amounts and sub-ranges there-between. The 1-methoxy-2-propanol may be omitted from the second organic solvent.

The anti-fogging composition may be spray applied to the first major surface of the reflective substrate. The anti-fogging composition may be spray applied by an automatic spray machine. The anti-fogging composition may be spray-applied at an atomizing air pressure ranging from about 10 psi to about 60 psi—including all pressures and sub-ranges there-between. In a preferred embodiment, the anti-fogging composition may be spray-applied at an atomizing air pressure ranging from about 30 psi to about 60 psi—including all pressures and sub-ranges there-between. The anti-fogging composition may be applied in a single pass or as multiple passes. In some embodiments, the anti-fogging composition may be applied in two or more application steps.

The anti-fogging composition may be applied in the wet-state to the upper surface 1410 of the reflective substrate 1400 in an amount ranging from about 4 $g/ft^2$ to about 8 $g/ft^2$—including all amounts and sub-ranges there-between. In a preferred embodiment, the anti-fogging composition may be applied in the wet-state to the upper surface 1410 of the reflective substrate 1400 in an amount ranging from about 4.5 $g/ft^2$ to about 7 $g/ft^2$—including all amounts and sub-ranges there-between. In an even more preferred embodiment, the anti-fogging composition may be applied in the wet-state to the upper surface 1410 of the reflective substrate 1400 in an amount ranging from about 5.0 $g/ft^2$ to about 6.5 $g/ft^2$—including all amounts and sub-ranges there-between.

Once the anti-fogging composition is applied to the reflective substrate and the reflective substrate is through (i.e., downstream) the anti-fogging station 220, the reflective substrate may be transferred from the acceleration conveyor 202 to a deceleration conveyor 203. The decelerating conveyor 203 of the anti-fogging stage 200 may be the same as the decelerating conveyor 103 of the primer stage 100 in that both decelerating conveyors are separate units but perform the same function using the same operation parameters. Specifically, the deceleration conveyor 203 may be operated at a constant or non-constant speed. In a preferred embodiment, the deceleration conveyor 203 is operated at a substantially constant speed.

The deceleration conveyor 203 receives the anti-fogging coated reflective substrate whereby the upper surface faces upward and the lower surface faces the deceleration conveyor 203 such that the deceleration conveyor 203 supports the reflective substrate. The deceleration conveyor 203 then conveys the reflective substrate along the machine direction 5 in a non-constant and decreasing velocity.

For curtain coating applications, the deceleration conveyor 203 may decrease the velocity of the reflective substrate along the machine direction 5 from about 1,500% to about 3,500% compared to the final or maximum velocity of the reflective substrate along the acceleration conveyor 202—including all velocities and sub-ranges there-between.

For spray coating applications, the deceleration conveyor 203 may decrease the velocity of the reflective substrate along the machine direction 5 from about 200% to about 300% compared to the final or maximum velocity of the reflective substrate along the acceleration conveyor 202—including all velocities and sub-ranges there-between.

Downstream of the anti-fogging station 220 is a second drying station 230. The second drying station 230 may comprise a housing through which the deceleration conveyor 203 passes. Therefore, the reflective substrate may pass through the housing of the second drying station 230 via the deceleration conveyor 203. The housing may comprise one or more heating units 231 that heat the housing to an elevated temperature. The elevated temperatures may range from about 70° F. to about 300° F.—including all temperatures and sub-ranges there-between. In some embodiments, the elevated temperatures may range from about 70° F. to about 120° F.—including all temperatures and sub-ranges there-between. Drying temperature up to about 300° F. may be achieved using an IR tunnel.

The reflective substrate may pass through the second drying station 230 at a velocity such that the reflective substrate is exposed to the elevated temperature for a second drying time period ranging from about 4 min to about 10 min—including all times and sub-ranges there-between. The elevated temperature and second drying time period may be selected such that substantially all of the second liquid carrier has been evaporated from the first major surface of the reflective substrate.

In a non-limiting embodiment, the reflective substrate may pass through the second drying state 230 at a speed ranging from about 3 ft/min to about 18 ft/min—including all speeds and sub-ranges there-between. In a non-limiting embodiment, the reflective substrate may pass through the second drying state 230 at a speed ranging from about 5 ft/min to about 18 ft/min—including all speeds and sub-ranges there-between. In a preferred embodiment, the reflective substrate may pass through the second drying state 230 at a speed ranging from about 10 ft/min to about 15 ft/min—including all speeds and sub-ranges there-between.

Alternatively, in other embodiments where the second carrier may not have been evaporated from the first major surface of the reflective substrate, the anti-fogging stage 200 may further comprise additional drying stations 150 that are downstream of the second drying station 230 and connected along the machine direction 5 by separate high temperature belt conveyors 10.

In a non-limiting example, a high temperature belt conveyor 10 may transfer anti-fogging coated reflective substrate from second drying station 230 to a third drying station 250. The third drying station 250 may be downstream from the second drying station 230 along the machine direction 5. The third drying station 250 may comprise a housing through which the conveyor 4 passes. Therefore, the reflective substrate may pass through the housing of the third drying station 250 via the conveyor 4.

The housing may comprise one or more heating units 251 that heat the housing to an elevated temperature. The elevated temperatures may range from about 250° F. to about 325° F.—including all temperatures and sub-ranges there-between. Preferred, the elevated temperatures may range from about 275° F. to about 310° F.—including all temperatures and sub-ranges there-between. The reflective substrate may pass through the third drying station 250 at a velocity such that the reflective substrate is exposed to the elevated temperature for a third drying time period ranging from about 7 min to about 15 min—including all times and sub-ranges there-between. The elevated temperature and second drying time period may be selected such that substantially all of the second liquid carrier has been evaporated from the first major surface of the reflective substrate.

According to certain embodiments, the anti-fogging stage 200 may optionally comprise a fourth and fifth drying station 250a, 250b that are subsequently downstream 5 from the third drying station 250 and connected along the machine direction 5 by separate high temperature belt conveyors 10. Each of the fourth and fifth drying stations 250a, 250b may each comprise a heating unit 251a, 251b that may be the same as the heating units of the previous drying stations in that the heating units are separate units but perform the same function using the same operation parameters.

Downstream of the final drying station (which may depend based on the particular embodiment but may be the second drying station 230, the third drying station 251, the fourth drying station 251a, or the fifth drying station 251b) is a second cooling station 260. The second cooling station 260 may comprise a housing through which the conveyor 4 passes. The housing may comprise one or more cooling units (not pictured) that help cool reflective substrate from the elevated temperature back to lower temperature. The cooling units may be the same as the cooling units of the first cooling station 140 in that the cooling units are separate units but perform the same function using the same operation parameters.

The second cooling station 260 may perform the cooling by blowing ambient temperature air (i.e., air at room temperature, about 70° F.) or cooled air onto the reflective substrate. The cooled air may have a temperature ranging from about 40° F. to about 70° F.—including all temperatures and sub-ranges there-between. The reflective substrate may pass through the second cooling station 260 along the machine direction 5 via the conveyor 4 at a velocity such that the reflective substrate is cooled for a second cooling time period that ranges from about 10 min to about 25 min—including all times and sub-ranges there-between. The second cooling time period may be selected such that the reflective substrate exhibits a maximum temperature of about 110° F.

Downstream of the second cooling station 260 is the exit point 3 of the application system 1, whereby the fully coated reflective substrate may be moved to another stage of manufacturing, for example, as assembly with a frame to form a fog-free mirror apparatus (not pictured).

The application system 1 of the present invention may also be described as comprising a plurality of sequential steps A, B, C, D, E, F, whereby all steps are performed in order or, alternatively, a number of steps may be omitted. According to the present invention, a primer step A may be performed, whereby the primer step A corresponds to the primer stage 100, as previously discussed. Subsequent to the primer step A is an anti-fogging step B that corresponds to the application of the anti-fogging composition to the reflective substrate and the subsequent drying in the second drying station 230. The plurality of steps may further comprise one or more additional drying steps C, D, E that correspond to the drying performed by the third, fourth, and fifth drying stations 250, 250a, 250b. Finally, the plurality of steps may further comprise a final cooling step F that corresponds to the cooling performed by the second cooling station 260.

With this in mind, the present invention, application system 1 provides a number of different iterations of steps A, B, C, D, E, and/or F. In some embodiments, the anti-fogging process of the present invention may comprise steps A, B, and F—whereby steps C, D, and E are omitted. In other embodiments, the anti-fogging process of the present invention may comprise steps B and F—whereby steps A, C, D, and E are omitted. In other embodiments, the anti-fogging process of the present invention may comprise steps A, B, C, and F—whereby steps D and E are omitted. In other embodiments, the anti-fogging process of the present invention may comprise steps B, C, and F—whereby steps A, D, and E are omitted.

It has been discovered that using the anti-fogging application process of the present invention, which includes the anti-fogging composition, highly-reflective substrates that are fog-resistance can be formed at fast manufacturing speed without detrimental impact to aesthetic properties, such as yellowing of the reflective surface, surface distortion (also referred to as "fish eyes"), or imperfections (e.g., pin holing"). The dried anti-fogging coating atop the major surface exhibits a glass-like appearance that is suitable for mirror applications.

The invention will be described in greater detail by way of specific examples. The following examples are offered for illustrative purposes and are not intended to limit the invention in any manner. While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

EXAMPLES

Experiment 1—Spray Test of the Anti-Fogging Formulation

The following experiment demonstrates the benefit of the solvent formulation according to the present invention in creating an anti-fogging surface coating. Specifically, the following experiment includes a number of anti-fogging coatings (referred to herein as Examples 1-4) as well as a comparative anti-fogging coating (referred to herein as Comparative Example 1). Each anti-fogging coating comprises anti-fogging agent that is a blend of polysiloxane and polyurethane. The flow additive comprises a standard rheology modifier. The formulation of each anti-fogging coating is set forth below in Table 1.

A number of reflective glass substrates were treated with each anti-fogging coating. Specifically, a major surface of each reflective substrate that forms the reflective surface was spray coated with a different anti-fogging coating of Examples 1-4 and Comparative Examples 1-3. The spray coating was performed at room temperature using an automatic spray machine, applying two (2) wet cross-coats. Each anti-fogging coated reflective substrate was then flashed for about 5 minutes in ambient temperature air, followed by being oven cured for a total time of 30 minutes at a temperature ranging from about 275° F. to about 300° F. The reflective substrate was then allowed to cool to a temperature of about 90° F.

Once cool, each substrate was evaluated for (1) anti-fogging performance, (2) scratch-resistance, and (3) aesthetic properties that included the presence or absence of streaking, surface distortion (also referred to as "fish eyes") or imperfections (e.g., pin holing"). The results of each evaluation are set forth below in Table 2 and are indicated by a high-pass ("HP"), pass ("P"), a low-pass ("LP"), or failing ("F"). An high pass (HP) value is deemed to greatly exceed the commercially acceptable threshold thereby providing a superior product that will result in long-lifespan of the product during normal use. A pass (P) value is deemed to be an average commercially acceptable product—whereby the product may exhibit some minor defects in one or more of the record properties. A LP value is deemed to barely exceed the minimal commercial acceptable threshold, whereby the product still exhibits imperfections in the anti-fogging coating in the form of streaking, distortion, pin-holing, and/or yellowing. A 'fail' value is deemed commercially unacceptable because of too great an amount of imperfections in the anti-fogging coating in the form of streaking, distortion, pin-holing, and/or yellowing and/or exhibit inferior scratch-resistance. The results are set forth in Table 2 below.

TABLE 1

|  | Comp. Ex. 1 | Comp. Ex. 2 | Comp. Ex. 3 | Ex. 1 | Ex. 2 | Ex. 3 | Ex. 4 | Ex. 5 |
| --- | --- | --- | --- | --- | --- | --- | --- | --- |
| Water | 10.0-30.0 | 10.0-30.0 | 12.3 | 12.1 | 7.0 | 8.4 | 8.6 | 7.4 |
| Methanol | 10.0-30.0 | 10.0-30.0 | 41.2 | 6.1 | 23.5 | 28.1 | 28.8 | 24.8 |
| Ethanol | 1.0-5.0 | — | — | 0.6 | — | — | — | — |
| n-Butanol | 10.0-30.0 | — | 3.7 | 7.9 | 2.0 | 2.5 | 2.6 | 2.2 |
| 1-Methoxy-2-Propanol | 10.0-30.0 | 10.0-30.0 | 4.3 | 47.8 | 2.5 | 3.0 | 18.0 | 15.5 |
| Toluene | <1.0 | — | — | 0.2 | — | — | — | — |
| 2-Butoxyethyl Acetate | — | 1.0-5.0 | — | 0.1 | — | — | — | — |
| Diacetone Alcohol | — | — | — | 4.3 | 33.0 | 20.5 | 15.0 | 25.8 |
| Methyl Ethyl Ketone | — | — | — | — | 9.0 | 10.2 | — | — |
| Anti-Fogging Agent | 10.0-20.0 | — | 17.6 | 4.0-8.0 | 9.5 | 11.3 | 11.2 | 9.5 |
| Silica | 10.0-30.0 | 30.0 | 19.9 | 11.0-19.0 | 12.5 | 15.0 | 14.8 | 12.7 |
| Flow Additive | — | — | 1.0 | — | 1.0 | 1.5 | 1.0 | 2.1 |
| Total wt. % | 100.0 | 100.0 | 100.0 | 100.0 | 100.0 | 100.0 | 100.0 | 100.0 |
| Solid's Content | 37.0-40.0% | 30.0% | 38.5% | 20.8% | 23.0% | 27.8% | 27.0% | 24.3% |

TABLE 2

|  | Comp. Ex. 1 | Comp. Ex. 2 | Comp. Ex. 3 | Ex. 1 | Ex. 2 | Ex. 3 | Ex. 4 | Ex. 5 |
|---|---|---|---|---|---|---|---|---|
| Anti-Fogging Performance | HP | F | HP | HP | HP | HP | HP | HP |
| Scratch Resistance | LP | HP | HP | HP | HP | HP | LP | LP |
| Streaking | LP | LP | F | HP | P | P | LP | LP |
| Surface Distortion | LP | LP | F | HP | P | P | LP | LP |
| Pin-Holing | LP | LP | F | HP | P | P | LP | LP |

As demonstrated by Table 2, while the anti-fogging coating composition of Example 1 performed the best when in both of terms of performance characteristics (i.e., anti-fogging and scratch resistance) as well as coating application (i.e., minimal streaking, surface distortion, pin-holing) on the glass substrate. This performance is surprising given that the coating composition of Example 1 includes less anti-fogging agent and anti-scratch agent (i.e., silica) compared to that of the comparative Examples 1-3. Additionally, while the coating compositions of Examples 2 and 3 were performed well with respect to the anti-fogging and scratch resistance as well as performed adequately with respect to the streaking, surface distortion, and pin-holding, the coatings of Example 1 still performed just as well, if not better, than that of Examples 2 and 3 at a lower solids content—i.e., requiring less silica (abrasive) and anti-fogging agent than that of Examples 2 and 3. Therefore, it has been surprisingly discovered that solvent formulation of Example 1 provides for superior coating performance (i.e., anti-fogging, scratch) while still maintaining the requisite coating characteristics (i.e., no streaking, no surface distortion, no pin-holing).

Additionally, the coating composition of Examples 2 and 3 performed better than that of the comparative examples at a lower anti-fogging and abrasive agent level. Additionally, the coatings of Examples 2 and 3 performed better than Examples 4 and 5 in terms of scratch resistance and minimal streaking, surface distortion, pin-holing. While the coating compositions of Examples 4 and 5 were still commercially acceptable in terms of scratch resistance and streaking, surface distortion, and pin-holding, the coatings of Examples 2 and 3 performed just as well, if not better, than that of Examples 2 and 3 at comparable solids content. Therefore, using the same solids content as Examples 4 and 5, better anti-fogging coatings can be achieved through the addition of methyl ethyl ketone.

In summary, it has been surprisingly discovered that using a solvent formulation of the present invention provides an unexpected benefit in aesthetic performance without degrading the anti-fogging nature of the overall coating while being able to reduce the overall amount of anti-fogging agent and anti-abrasive agent in the overall coating composition.

Experiment 2—Primer Test

A second experiment was performed to demonstrates the benefit of the primer formulation according to the present invention in creating an anti-fogging surface coating. Specifically, the following experiment includes two primer coatings of the present invention (referred to herein as Examples 6 and 7) as well as a comparative primer coating (referred to herein as Comparative Example 4). Each primer coating comprises primer agent that is a polyurethane polymer. The formulation of each primer coating is set forth below in Table 3.

TABLE 3

|  | Comp. Ex. 4 | Ex. 6 | Ex. 7 |
|---|---|---|---|
| Water | 71 wt. % | 67.5 wt. % | 64.6 wt. % |
| Primer Agent | 12 wt. % | 10.0 wt. % | 10.9 wt. % |
| Isopropyl Alcohol | — | 8.3 wt. % | 9.1 wt. % |
| N-Methyl-2-pyrrolidone | 3.5 wt. % | 2.9 wt. % | 3.2 wt. % |
| 2-butoxyethanol | 13.5 wt. % | 11.3 wt. % | 12.3 wt. % |
| Solid's Content | 12 wt. % | 10.0 wt. % | 10.9 wt. % |
| Total | 100 wt. % | 100 wt. % | 100 wt. % |

A number of reflective substrates each having a major surface that forms a reflective surface were spray coated with the primer coatings at room temperature using an automatic spray machine, applying two (2) wet cross-coats. The spray coats were applied using an atomization pressure in a range between 10 and 25 psi. The primer-coated reflective substrate was then flashed for about 5 minutes in ambient temperature air, followed by being oven cured for 3 minutes at a temperature of 300° F. The reflective substrate was then allowed to cool to a temperature of about 90° F.

Once the reflective substrate is cooled to the desired temperature, the major surface is then spray coated with the anti-fogging coating of the present invention. Specifically, the anti-fogging coating composition of Example 2 was used with primer coating of Example 6, and the anti-fogging coating composition of Example 4 was used with the primer coating of Example 7. Each anti-fogging coating was applied using an automatic spray machine, applying two (2) wet cross-coats. The anti-fogging coated reflective substrate was then flashed for about 5 minutes in ambient temperature air, followed by being oven cured for a total time of 30 minutes at a temperature ranging from about 275° F. to about 300° F. The reflective substrate was then allowed to cool to a temperature of about 90° F.

Each substrate was then evaluated for coverage and peel of the anti-fogging coating atop the reflective substrate. The results of each evaluation are set forth below in Table 4. A 'pass' value is deemed commercially acceptable for the anti-fogging coating covering and not peeling from the major surface of the reflective substrate. A 'fail' value is deemed commercially unacceptable because of too great an amount of either poor coverage or insufficient peel strength of the anti-fogging coating on the reflective substrate. A 'high-pass' value is also deemed commercially acceptable while and exhibits substantially perfect coverage and uniform peel strength across the reflective substrate.

TABLE 4

|  | Comp. Ex. 2 | Ex. 5 | Ex. 6 |
|---|---|---|---|
| Peel Strength | Pass | High Pass | High Pass |
| Coverage | Pass | High Pass | High Pass |

As demonstrated by Table 4, the primer coating of the present invention provides an unexpected improvement in coverage and peel strength of the anti-fogging coating of the present invention—even when relatively lower amounts of primer agent is used in the coating formulation.

As those skilled in the art will appreciate, numerous changes and modifications may be made to the embodiments described herein, without departing from the spirit of the invention. It is intended that all such variations fall within the scope of the invention.

What is claimed is:

1. A method of forming a reflective article comprising:
 a) applying an anti-fog composition to a major surface of a reflective substrate, the anti-fog composition comprising an anti-fog agent, silica, and a liquid carrier and having a solid's content between about 10 wt. % to about 30 wt. % based on the total weight of the anti-fog composition;
 b) heating the reflective substrate to a temperature of about 120° F. to about 325° F. for a drying period;
 wherein the anti-fog agent is selected from polysiloxane, a urethane-containing compound, and blends thereof;
 wherein the liquid carrier comprises toluene, 2-butoxylethyl acetate, and a hydroxyl-containing component,
 the hydroxyl-containing component comprises:
  diacetone alcohol present in an amount from about 1 wt. % to about 35 wt. %, based on the total weight of the anti-fog composition,
  1-methoxy-2-propanol present in an amount ranging from about 35 wt. % to about 55 wt. % based on the total weight of the anti-fog composition,
  butanol present in an amount from about 1 wt. % to about 10 wt., based on the total weight of the anti-fog composition,
  methanol present in an amount from about 4 wt. % to about 30 wt. %, based on the total weight of the anti-fog composition; and
  ethanol present in an amount from about 0.1 wt. % to about 3 wt. % based on the total weight of the anti-fog composition; and
 wherein the diacetone alcohol and ethanol are present in a weight ratio ranging from about 1:1 to about 10:1; and
 wherein the liquid carrier is substantially free of methyl ethyl ketone.

2. The method of forming a reflective article according to claim 1, wherein the temperature of step b) ranges from about 275° F. to about 310° F.

3. The method of forming a reflective article according to claim 1, wherein the methanol is present in an amount from about 4 wt. % to about 10 wt. %.

4. The method of forming a reflective article according to claim 1, wherein the hydroxyl-containing component is present in an amount ranging from about 60 wt. % to about 80 wt. % based on the total weight of the anti-fog composition.

5. The method of forming a reflective article according to claim 1, wherein the major surface of the reflective substrate comprises inorganic glass.

6. The method of forming a reflective article according to claim 1, wherein the anti-fog composition is applied in step a) by spray application, wherein the spray application is operated at an atomizing air pressure ranging from about 30 psi to about 60 psi.

7. The method according to claim 1, wherein the anti-fog composition is applied to the major surface of the reflective substrate in an amount ranging from about 4 $g/ft^2$ to about 8 $g/ft^2$.

8. A method of forming a reflective article comprising:
 a) spray applying an anti-fog composition to a major surface of a reflective substrate, the anti-fog composition comprising:
  an anti-fog agent;
  silica; and
  a liquid carrier comprising 2-butoxyethyl acetate, methyl ethyl ketone, and a hydroxyl-containing component that includes the following:
   methanol;
   n-butanol;
   1-methoxy-2-propanol; and
   diacetone alcohol;
 wherein the liquid carrier is substantially free of ethanol;
 wherein the hydroxy-containing component is present in an amount ranging from about 60 wt. % to about 80 wt. % based on the total weight of the anti-fog composition; and
 wherein the anti-fog composition has a solids content ranging from about 15 wt. % to about 30 wt. % based on the total weight of the anti-fog composition;
 b) heating the reflective substrate to an elevated temperature to evaporate at least a portion of the liquid carrier from the major surface of the reflective substrate;
 wherein the anti-fog composition is applied to the major surface of the reflective substrate in an amount ranging from about 4 $g/ft^2$ to about 8 $g/ft^2$.

9. The method according to claim 8, wherein the anti-fog composition further comprises water in an amount ranging from about 5 wt. % to about 20 wt. % based on the total weight of the anti-fog composition.

10. The method according to claim 8, wherein the anti-fog agent is selected from polysiloxane, a urethane-containing compound, and blends thereof.

11. The method according to claim 8, wherein the elevated temperature ranges from about 80° F. to about 315° F.

12. The method according claim 8, wherein the major surface of the reflective substrate comprises inorganic glass.

* * * * *